3,097,208
LOWER ALKYL 4-PHENYL-1-[(AROMATIC N-HETERYL)-ALIPHATIC]PIPERIDINE - 4 - CARBOXYLATES AND THEIR SYNTHESIS
Bill Elpern, Walnut Creek, Calif., assignor to Sterling Drug Inc., New York, N.Y., a corporation of Delaware
No Drawing. Filed Sept. 12, 1955, Ser. No. 533,891
9 Claims. (Cl. 260—294.3)

The present invention relates to compositions of matter and their preparation, and is concerned with an improvement in the substituent attached to the nitrogen atom or 1-position of the piperidine ring in the class of chemical compounds identified as lower alkyl 4-phenyl-1-(substituted)-piperidine-4-carboxylates. In particular, the compounds of this invention are those having an (aromatic N-heteryl)-aliphatic radical as the 1-substituent.

Attempts have been made for some time to develop analgesics having high activity. The highly potent morphine has the disadvantages of causing nausea, vomiting, constipation and respiratory depression, and for these reasons has been supplanted largely by meperidine, ethyl 4-phenyl-1-methylpiperidine-4-carboxylate, especially in obstetrics where depression of respiration is highly undesirable. Because of the relatively high dose required, meperidine has to be injected in hypertonic concentrations, with a consequent risk of irritation at the site of administration. This limits the choice of concentrations which can be used and restricts undesirably the free choice of optimum dosage. This situation is advantageously modified with the compounds of my invention since they are many times more potent as analgesics than meperidine and thus can be administered in smaller volumes of solution and at higher therapeutic levels of effectiveness without making the solution hypertonic. This reduces any tendency to undesirable accompanying irritation, and improves the therapeutic usefulness of the medicament.

U.S. Patent 2,167,351 broadly shows lower alkyl 4-aryl-1-(substituted)piperidine-4-carboxylates where the 1-substituent is a monovalent hydrocarbon radical. Included among the specific examples are such compounds having 1-methyl and 1-benzyl substituents, the latter being of value primarily as intermediates for the former. The 1-methyl compounds are now known and accepted as effective, morphine-like central analgesics and atropine-like smooth muscle neurospasmolytics in the relief of severe pain. An outstanding example of these 1-methyl compounds is the commercially available meperidine hydrochloride, ethyl 4-phenyl - 1 - methylpiperidine-4-carboxylate hydrochloride. On the other hand, the intermediate 1-benzyl compounds have been found to have a decidedly lower analgesic activity compared with the 1-methyl compounds. For example, ethyl 4-phenyl-1-benzylpiperidine-4-carboxylate as its hydrochloride has been found to be only approximately one-fourth as effective an analgesic as meperidine hydrochloride when tested by the Bass-Vander Brook modification of the D'Amour-Smith method. This decrease in activity in going from 1-methyl to 1-benzyl would indicate that 1-phenylalkyl substituents are undesirable, and would thus lead investigators away from these compounds, and away from compounds such as those of the instant invention.

I have now prepared lower alkyl 4-phenyl-1-[(aromatic N-heteryl)-aliphatic]piperidine-4-carboxylates and surprisingly found them to be markedly superior as analgesics as compared with the corresponding 1-benzyl compounds of U.S. Patent 2,167,351 and, indeed, more effective than the corresponding 1-methyl compounds, even meperidine itself. For example, my ethyl 4-phenyl-1-[2-(4-pyridyl)ethyl]piperidine-4-carboxylate as its dihydrochloride salt, when measured as hereinbefore mentioned, is approximately ten times as effective an analgesic as meperidine hydrochloride, or thus having an analgesic activity approximately forty times that of the corresponding known 1-benzyl compound. In addition to having this high analgesic activity, my compounds have a relatively low toxicity; for example, ethyl 4-phenyl-1-[2-(4-pyridyl)ethyl]piperidine-4-carboxylate dihydrochloride is only about one and one-half times as toxic [intravenous toxicity in mice when measured by a procedure similar to that described by Hoppe et al., J. Pharm. & Exp. Therap. 95, 502 (1949)] as meperidine hydrochloride, so that its therapeutic index compared with meperidine hydrochloride is approximately seven.

My compounds in free base form have the formula

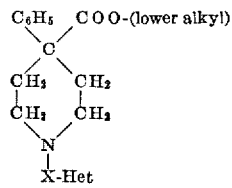

where X is a lower divalent aliphatic hydrocarbon radical and Het is a monocyclic aromatic N-heteryl radical having five to six ring atoms and including in the heterocyclic ring a carbon-nitrogen double bond.

The lower alkyl radical of the above formula preferably has from one to six carbon atoms inclusive, and includes such radicals as methyl, ethyl, n-propyl, isopropyl, n-butyl, isobutyl, 2-butyl, n-amyl, n-hexyl, and the like.

The monocyclic aromatic N-heteryl radical designated above as Het is a nitrogen-containing heteryl radical containing five to six ring atoms; and includes radicals such as pyridyl, pyrimidyl, thiazolyl, oxazolyl and pyridazyl. These N-heteryl radicals are attached to the aliphatic hydrocarbon radical X through one of their ring-carbon atoms and include all isomeric forms such as 2-pyridyl, 3-pyridyl and 4-pyridyl for pyridyl; 2-pyrimidyl, 4-pyrimidyl, 5-pyrimidyl and 6-pyrimidyl for pyrimidyl; 2-thiazolyl, 4-thiazolyl and 5-thiazolyl for thiazolyl; et cetera.

The lower divalent aliphatic hydrocarbon radical designated above as X can have from one to six carbon atoms, and preferably has from two to four carbon atoms and having its two free valence bonds on different carbon atoms. Preferred embodiments for X thus include —$CH_2CH_2$—, —$CH_2CH_2CH_2$—, —$CH_2CH_2CH_2CH_2$—, —CH=CH—, —CH=CHCH$_2$—, —$CH_2$CH=CH—, —$CH_2$CH=CHCH$_2$—, —C≡C—, —C≡CCH$_2$—, —$CH_2$C≡CCH$_2$, and the like.

The compounds of this invention can be prepared by the reaction of a lower alkyl 4-phenylpiperidine-4-carboxylate with an equimolar amount of the appropriate (aromatic N-heteryl)-aliphatic ester of a strong inorganic or an organic sulfonic acid. The reaction is generally carried out at a temperature between about 50° C. and 150° C., preferably at reflux, in a lower alkanol solvent. Other methods, such as the reaction of a lower alkyl 4-phenylpiperidine - 4 - carboxylate with the appropriate aldehyde under catalytic hydrogenation conditions, can be used. A convenient method for preparing the compounds having a 1-[2-(heteryl)ethyl] substituent is the reaction of a vinyl-heterocyclic compound, such as 4-vinylpyridine or 2-vinylpyrimidine, with a lower alkyl 4-phenylpiperidine-4-carboxylate.

A preferred subgenera of my invention are the compounds having in free base form the following formula

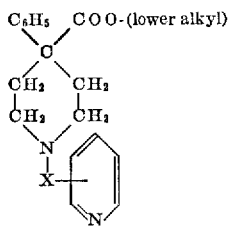

Where the lower alkyl radical has from one to six carbon atoms inclusive, X is a divalent aliphatic hydrocarbon radical having from two to four carbon atoms inclusive and having its free valence bonds on different carbon atmos, and X can be attached to any of the three available positions of the pyridine ring. These compounds are prepared by reacting a lower alkyl 4-phenylpiperidine-4-carboxylate with a pyridyl-aliphatic ester of a strong inorganic acid or an organic sulfonic acid, said ester having the formula

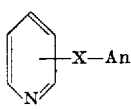

where An is an anion of a strong inorganic acid or an organic sulfonic acid. Illustrative of the pyridyl-aliphatic esters used in the process of my invention are 3-(4-pyridyl)propyl bromide, 3-(4-pyridyl)-2-propenyl bromide, 2-(3-pyridyl)ethyl chloride, 4-(2-pyridyl)butyl iodide, 4-(4-pyridyl)-2-butynyl bromide, 2-(4-pyridyl)-propyl sulfate, 3-(2-pyridyl)propyl methanesulfonate, 2-(4-pyridyl)ethyl benzenesulfonate, 2-(4-pyridyl)butyl para-toluenesulfonate, and the like. The preferred esters are the pyridyl-aliphatic halides. The reaction is carried out by heating the lower alkyl 4-phenylpiperidine-4-carboxylate with the appropriate pyridyl-aliphatic ester; for example, ethyl 4-phenyl-1-[3-(4-pyridyl)propyl]piperidine-4-carboxylate is obtained by heating ethyl 4-phenylpiperidine-4-carboxylate with 3-(4-pyridyl)propyl bromide. The reaction can be carried out either in the presence or absence of a suitable solvent, but preferably using a solvent such as a lower alkanol. A preferred procedure is to conduct the reaction in refluxing n-butanol with stirring in the presence of an alkaline agent such as sodium carbonate to neutralize the hydrogen halide formed by the reaction. Since the preferred intermediate ethyl 4-phenylpiperidine-4-carboxylate, forms an insoluble carbonate when treated with carbon dioxide, a convenient way of ascertaining whether the reaction is complete or not is merely to treat the reaction mixture with carbon dioxide, the absence of a precipitate indicating completeness of the reaction. The product is isolated in free base form or in the form of an acid addition salt.

Preferred embodiments of my invention are the lower alkyl 4-phenyl-1-[2-(pyridyl)ethyl]piperidine-4-carboxylates which in free base form have the formula

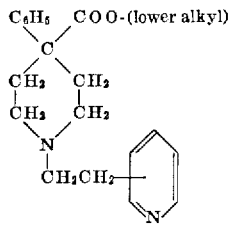

where the lower alkyl radical has one to six carbon atoms. These compounds are prepared preferably by using a vinylpyridine as the pyridylalkylating agent. This reaction is carried out by heating a lower alkyl 4-phenyl- piperidine-4-carboxylate with a vinylpyridine of the formula

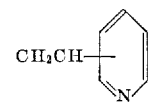

where the vinyl substituent can be in any of the three available positions of the pyridine ring, i.e., positions 2, 3 or 4. For example, reaction of methyl 4-phenylpiperidine-4-carboxylate with 2-vinylpyridine, 3-vinylpyridine or 4-vinylpyridine yields methyl 4-phenyl-1-[2-(2-pyridyl)ethyl]piperidine-4-carboxylate, methyl 4-phenyl-1-[2-(3-pyridyl)ethyl]piperidine-4-carboxylate, or methyl 4-phenyl-1-[2-(4-pyridyl)ethyl]piperidine-4-carboxylate, respectively. The reaction is carried out preferably using an appropriate solvent, such as a lower alkanol, although the solvent can be omitted if desired. I have preferred to run the reaction in refluxing n-butanol. The product is isolated in free base form or in the form of an acid addition salt.

My new lower alkyl 4-phenyl-1-[(aromatic N-heteryl)-aliphatic]piperidine-4-carboxylates are useful either in the free base form or in the form of acid addition salts, and these salts are within the purview of the invention. The acids which can be used to prepare acid addition salts are preferably those which produce, when combined with the free base, salts whose anions are relatively innocuous to the animal organism in therapeutic doses of the salts, so that the beneficial physiological properties inherent in the free base are not vitiated by side effects ascribable to the anions. In practicing my invention, I found it convenient to employ the hydrochloride salt. However, other appropriate acid addition salts are those derived from mineral acids such as hydrobromic acid, hydriodic acid, nitric acid, phosphoric acid and sulfuric acid; and organic acids such as acetic acid, citric acid, tartaric acid, lactic acid, quinic acid, methanesulfonic acid, ethanesulfonic acid, and the like, giving the hydrobromide, hydriodide, nitrate, phosphate, sulfate, acetate, citrate, tartrate, lactate, quinate, methanesulfonate, and ethanesulfonate salts, respectively.

The following examples will further illustrate the invention without, however, limiting it thereto.

*Example 1*

*Lower alkyl 4-phenyl-1-[2-(aromatic N-heteryl)ethyl]-piperidine-4-carboxylates.*—The preparation of these compounds is illustrated by the following preparation of ethyl 4-phenyl-1-[2-(4-pyridyl)ethyl]piperidine-4-carboxylate as follows: Ethyl 4-phenylpiperidine-4-carboxylate hydrochloride (13.5 g.) was converted to its free base form by dissolving it in 200 ml. of n-butanol, and adding 2 g. of sodium hydroxide in a minimum of water and 100 ml. of saturated aqueous sodium chloride solution. The aqueous layer was quickly separated and the organic layer added to 5.26 g. of freshly distilled 4-vinylpyridine. The resulting solution was refluxed for twenty-four hours, cooled, filtered, treated with carbon dioxide (no carbonate formed indicating completeness of reaction), and then saturated with hydrogen chloride. Then, 200 ml. of ether was added; the resulting white precipitate was collected and recrystallized once from isopropanol and once from absolute ethanol, yielding the product, ethyl 4-phenyl-1-[2-(4-pyridyl)ethyl]piperidine-4-carboxylate in the form of its dihydrochloride, M.P. 205.2–209.0° C. (corr.).

*Anal.*—Calcd. for $C_{21}H_{26}N_2O_2 \cdot 2HCl$: C, 61.32; H, 6.86; Cl, 17.25. Found: C, 61.07; H, 6.41; Cl, 17.06.

Ethyl 4-phenyl-1-[2-(4-pyridyl)ethyl]piperidine-4-carboxylate is obtained in free base form by dissolving the above-described dihydrochloride in water, adding sodium hydroxide solution, extracting the liberated base with ether, drying the ether extract over anhydrous sodium sulfate, evaporating the ether solution slowly to dryness in vacuo, chilling the residual material until crystalline, and recrystallizing this material from ethanol-water. The product, ethyl 4-phenyl-1-[2-(4-pyridyl)ethyl]piperidine-4-carboxylate, melted at 63.8–66.0° C. (corr.).

Following the above procedure but using methyl 4-phenylpiperidine-4-carboxylate, isopropyl 4-phenylpiperidine-4-carboxylate, n-butyl 4-phenylpiperidine-4-carboxylate, or n-hexyl 4-phenylpiperidine-4-carboxylate in place of ethyl 4-phenylpiperidine-4-carboxylate, there is obtained the following respective compounds:

methyl 4-phenyl-1-[2-(4-pyridyl)ethyl]piperidine-4-carboxylate,
isopropyl 4-phenyl-1-[2-(4-pyridyl)ethyl]piperidine-4-carboxylate,
n-butyl 4-phenyl-1-[2-(4-pyridyl)ethyl]piperidine-4-carboxylate,
or n-hexyl 4-phenyl-1-[2-(4-pyridyl)ethyl]piperidine-4-carboxylate.

Following the above procedure but using 2-vinylpyrimidine, 2-vinylthiazole, 2-vinyloxazole, or 4-vinylpyridazine in place of 4-vinylpyridine, there is obtained the following respective compounds:

ethyl 4-phenyl-1-[2-(2-pyrimidyl)ethyl]piperidine-4-carboxylate,
ethyl 4-phenyl-1-[2-(2-thiazolyl)ethyl]piperidine-4-carboxylate,
ethyl 4-phenyl-1-[2-(2-oxazolyl)ethyl]piperidine-4-carboxylate,
or ethyl 4-phenyl-1-[2-(4-pyridazyl)ethyl]piperidine-4-carboxylate, Pharmacological evaluation of ethyl 4-phenyl-1-[2-(4-pyridyl)ethyl]piperidine-4-carboxylate dihydrochloride in aqueous solution administered subcutaneously by the Rat Thermal Stimulus Method of Bass and Vander Brook [J. Am. Pharm. Assoc., Sci. Ed., 41, 569–570 (1952)] has shown that this compound is approximately ten times as active an analgesic as ethyl 4-phenyl-1-methylpiperidine-4-carboxylate hydrochloride. This compound was found to have an acute toxicity in mice of 22.2±1.7 mg. per kg. when administered intravenously in aqueous solution.

*Example 2*

*Lower alkyl 4-phenyl-1-[2-(2-pyridyl)ethyl]piperidine-4-carboxylates.*—The preparation of these compounds was carried out following the procedure described above in Example 1 using the appropriate reactants, as illustrated by the preparation of ethyl 4-phenyl-1-[2-(2-pyridyl)ethyl]piperidine-4-carboxylate using 11.6 g. of ethyl 4-phenylpiperidine-4-carboxylate, 450 ml. of n-butanol and 5.3 g. of 2-vinylpyridine. The product in the form of its dihydrochloride salt melted at 172.1–173.4° C. (corr.).

*Anal.*—Calcd. for $C_{21}H_{26}N_2O_2 \cdot 2HCl$: C, 61.32; H, 6.86; Cl, 17.25. Found: C, 60.84; H, 6.74; Cl, 17.11.

Ethyl 4-phenyl-1-[2-(2-pyridyl)ethyl]piperidine-4-carboxylate in free base form is prepared from its above-described dihydrochloride following the procedure described above under Example 1 for the conversion of ethyl 4-phenyl-1-[2-(4-pyridyl)ethyl]piperidine-4-carboxylate dihydrochloride into its free base form.

Other lower alkyl 4-phenyl-1-[2-(2-pyridyl)ethyl]piperidine-4-carboxylates that are obtained following the foregoing procedure using the appropriate intermediate lower alkyl 4-phenylpiperidine-4-carboxylate are:

methyl 4-phenyl-1-[2-(2-pyridyl)ethyl]piperidine-4-carboxylate,
n-propyl 4-phenyl-1-[2-(2-pyridyl)ethyl]piperidine-4-carboxylate,
isobutyl 4-phenyl-1-[2-(2-pyridyl)ethyl]piperidine-4-carboxylate,
and n-amyl 4-phenyl-1-[2-(2-pyridyl)ethyl]piperidine-4-carboxylate.

Pharmacological evaluation of ethyl 4-phenyl-1-[2-(2-pyridyl)ethyl]piperidine-4-carboxylate dihydrochloride in aqueous solution administered subcutaneously by the Rat Thermal Stimulus Method of Bass and Vander Brook, ibid., has shown that this compound is approximately five times as active an analgesic as ethyl 4-phenyl-1-methylpiperidine-4-carboxylate hydrochloride.

*Example 3*

*Lower alkyl 4-phenyl-1-[2-(3-pyridyl)ethyl]piperidine-4-carboxylates.*—The preparation of these compounds is carried out following the procedure described above in Example 1, as illustrated by the following preparation of ethyl 4-phenyl-1-[2-(3-pyridyl)ethyl]piperidine-4-carboxylate, using 13.5 g. of ethyl 4-phenylpiperidine-4-carboxylate hydrochloride and 5.26 g. of 3-vinylpyridine. The product, ethyl 4-phenyl-1-[2-(3-pyridyl)ethyl]piperidine-4-carboxylate is isolated in the form of its dihydrochloride. The compound in free base form is obtained following the procedure described above under Example 1 for the conversion of ethyl 4-phenyl-1-[2-(4-pyridyl)ethyl]piperidine-4-carboxylate dihydrochloride into its free base.

EXAMPLE 4

*Lower alkyl 4-phenyl-1-[(aromatic N-heteryl)-aliphatic]piperidine-4-carboxylates.* — The preparation of these compounds is illustrated by the preparation of ethyl 4-phenyl-1-[3-(4-pyridyl)propyl]piperidine-4-carboxylate as follows: A mixture of 13.5 g. of ethyl 4-phenylpiperidine-4-carboxylate hydrochloride, 14.0 g. of 3-(4-pyridyl)propyl bromide hydrobromide, 30.0 g. of sodium carbonate (an excess of this alkaline agent is used to neutralize the HBr and HCl, respectively, of the two above-named reactants before the reaction takes place between the two compounds in free base form) and 150 ml. of n-butanol was refluxed for twenty-four hours. The precipitated sodium bromide and sodium chloride were removed from the hot reaction mixture by filtration. The filtrate was allowed to cool, was treated with solid carbon dioxide, was allowed to stand for several hours, and then was filtered. The solvent was removed by distillation in vacuo, yielding a residual gummy material containing ethyl 4-phenyl-1-[3-(4-pyridyl)propyl]piperidine-4-carboxylate. This material was dissolved in ethanol and the alcohol solution was treated with gaseous hydrogen chloride. Addition of ether yielded a gummy precipitate which solidified upon trituration with acetone. Several recrystallizations of this solid from water-acetone yielded the product, ethyl 4-phenyl-1-[3-(4-pyridyl)propyl]piperidine-4-carboxylate as its dihydrochloride, M.P. 94.8–96.4° C. (corr.).

*Anal.*—Calcd. for $C_{22}H_{28}N_2O_2 \cdot 2HCl$: C, 62.12; H, 7.11; O, 7.53. Found: C, 62.26; H, 7.03; O, 7.35.

Ethyl 4-phenyl-1-[3-(4-pyridyl)propyl]piperidine-4-carboxylate in free base form is obtained from the above-described dihydrochloride following the procedure described above under Example 1 for the conversion of ethyl 4-phenyl-1-[2-(4-pyridyl)ethyl]piperidine-4-carboxylate dihydrochloride into its free base.

Other lower alkyl 4-phenyl-1-[(aromatic N-heteryl)-aliphatic]piperidine-4-carboxylates that are obtained following the foregoing procedure using the appropriate intermediate lower alkyl 4-phenylpiperidine-4-carboxylate and (aromatic N-heteryl)-aliphatic halide are:

methyl 4-phenyl-1-[4-(3-pyridyl)butyl]piperidine-4-carboxylate,
ethyl 4-phenyl-1-[3-(4-pyrimidyl)propyl]piperidine-4-carboxylate,
ethyl 4-phenyl-1-[3-(2-thiazolyl)propyl]piperidine-4-carboxylate,
n-propyl 4-phenyl-1-[4-(2-oxazolyl)butyl]piperidine-4-carboxylate,
ethyl 4-phenyl-1-[3-(4-pyridazyl)propyl]piperidine-4-carboxylate, ethyl 4-phenyl-1-[3-(4-pyridyl)-2-propynyl]piperidine-4-carboxylate, ethyl 4-phenyl-1-[3-(4-pyridyl)-2-propynyl]piperidine-4-carboxylate, ethyl 4-phenyl-1-[3-(2-pyrimidyl)-2-propenyl]piperidine-4-carboxylate, and the like.

My lower alkyl 4-phenyl-1-[(aromatic N-heteryl)-aliphatic]piperidine-4-carboxylates can be formulated in liquid preparations, e.g., aqueous or aqueous-ethanol menstruum, or in solid form, e.g., tablet or powder. The tablet formulation can be prepared using conventional excipients; and the powder can be compounded in capsule form. These preparations can be administered orally, or in the case of the aqueous preparations, intramuscularly or intravenously.

I claim:

1. A composition of matter selected from the group consisting of a compound having the formula

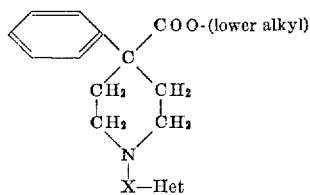

where X is a lower divalent aliphatic hydrocarbon radical and Het is a monocyclic aromatic nitrogen-containing heteryl radical having five to six ring atoms selected from the group containing of pyridyl, pyrimidyl, thiazolyl, oxazolyl and pyridazyl radicals which are attached to the aliphatic hydrocarbon radical X through one of their ring-carbon atoms; and its acid addition salts.

2. A lower alkyl 4-phenyl-1-(pyridyl-aliphatic)piperidine-4-carboxylate having the formula

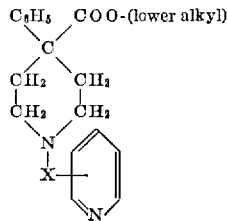

where X is a lower divalent aliphatic hydrocarbon radical.

3. A lower alkyl 4-phenyl-1-(pyridylalkyl)piperidine-4-carboxylate having the formula

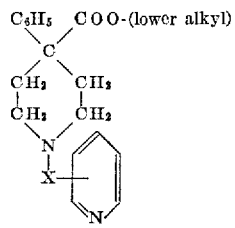

where X is an alkylene radical having from two to four carbon atoms inclusive and having its free valence bonds on different carbon atoms.

4. A lower alkyl 4-phenyl-1-[2-(pyridyl)ethyl]piperidine-4-carboxylate having the formula

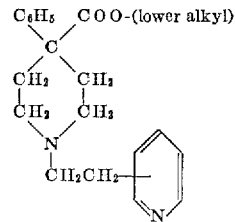

5. Ethyl 4-phenyl-1-[2-(4-pyridyl)ethyl]piperidine-4-carboxylate.

6. Ethyl 4-phenyl-1-[2-(2-pyridyl)ethyl]piperidine-4-carboxylate.

7. Ethyl 4-phenyl-1-[2-(3-pyridyl)ethyl]piperidine-4-carboxylate.

8. Ethyl 4-phenyl-1-[3-(4-pyridyl)propyl]piperidine-4-carboxylate.

9. A compound having the formula

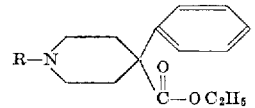

wherein R is selected from the group consisting of

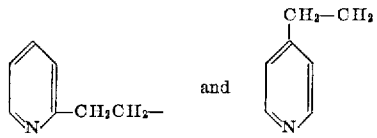

References Cited in the file of this patent

UNITED STATES PATENTS

| | | |
|---|---|---|
| 2,167,351 | Eisleb | July 25, 1939 |
| 2,189,404 | Renshaw et al. | Feb. 6, 1940 |
| 2,194,567 | Renshaw et al. | Mar. 26, 1940 |
| 2,412,956 | Barker | Dec. 24, 1946 |
| 2,486,795 | Kaegi | Nov. 1, 1949 |
| 2,824,875 | Elpern | Feb. 25, 1958 |

OTHER REFERENCES

Wegler: Chem. Abst., vol. 44, col. 5321h (1950).

UNITED STATES PATENT OFFICE
CERTIFICATE OF CORRECTION

Patent No. 3,097,208                                                  July 9, 1963

Bill Elpern

It is hereby certified that error appears in the above numbered patent requiring correction and that the said Letters Patent should read as corrected below.

Column 2, line 54, for "-$CH_2C\equiv CCH_2$," read -- -$CH_2C\equiv CCH_2$-, --; column 3, line 17, for "atmos" read -- atoms --; column 4, lines 3 to 8, the formula should appear as shown below instead of as in the patent:

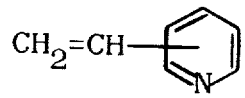

column 7, line 31, for "containing of" read -- consisting of --.

Signed and sealed this 3rd day of March 1964.

(SEAL)
Attest:

ERNEST W. SWIDER                                      EDWIN L. REYNOLDS

Attesting Officer                                          Acting Commissioner of Patents

UNITED STATES PATENT OFFICE
CERTIFICATE OF CORRECTION

Patent No. 3,097,208                            July 9, 1963

Bill Elpern

It is hereby certified that error appears in the above numbered patent requiring correction and that the said Letters Patent should read as corrected below.

Column 2, line 54, for "-$CH_2C \equiv CCH_2$," read -- -$CH_2C \equiv CCH_2$-, --; column 3, line 17, for "atmos" read -- atoms --; column 4, lines 3 to 8, the formula should appear as shown below instead of as in the patent:

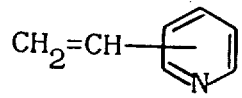

column 7, line 31, for "containing of" read -- consisting of --.

Signed and sealed this 3rd day of March 1964.

(SEAL)
Attest:

ERNEST W. SWIDER                          EDWIN L. REYNOLDS
Attesting Officer                         Acting Commissioner of Patents